United States Patent
Lesage et al.

(10) Patent No.: US 10,681,221 B1
(45) Date of Patent: Jun. 9, 2020

(54) METHOD AND A SYSTEM FOR DETECTING TELEPHONE NUMBERS USED BY SIM BOXES FOR SOLICITING TELEPHONE CALLS

(71) Applicant: ARAXXE, Lyons (FR)

(72) Inventors: Xavier Lesage, Neuilly sur Seine (FR); Christophe Scholer, Villeurbanne (FR); Philippe Orsini, Toulon (FR); Alexandre Marchal, Lyons (FR); Lilian Perron, Lyons (FR)

(73) Assignee: ARAXXE, Lyons (FR)

( * ) Notice: Subject to any disclaimer, the term of this patent is extended or adjusted under 35 U.S.C. 154(b) by 0 days.

(21) Appl. No.: 16/527,464

(22) Filed: Jul. 31, 2019

(51) Int. Cl.
*H04M 3/22* (2006.01)
*H04M 15/00* (2006.01)

(52) U.S. Cl.
CPC ......... *H04M 15/47* (2013.01); *H04M 3/2281* (2013.01); *H04M 2203/6027* (2013.01); *H04M 2215/0148* (2013.01); *H04M 2215/7231* (2013.01)

(58) Field of Classification Search
CPC .............. H04M 3/436; H04M 3/2281; H04M 2203/556; H04M 3/42059; H04M 1/663; H04M 2203/2027; H04M 2242/18; H04M 7/0078; H04M 3/2218; H04M 3/4878; H04M 3/493; H04M 1/64; H04M 2203/105; H04M 3/428; H04M 3/5166; H04M 3/5231; H04L 65/1079; H04L 51/12; H04L 63/14; H04L 63/1441; H04L 51/04; H04L 63/1416; H04W 4/029; H04W 4/60

See application file for complete search history.

(56) References Cited

U.S. PATENT DOCUMENTS

| | | | |
|---|---|---|---|
| 8,634,520 B1 * | 1/2014 | Morrison | H04M 3/4878 370/241 |
| 2016/0330319 A1 * | 11/2016 | Farrand | H04M 3/436 |
| 2018/0302513 A1 * | 10/2018 | Cohen | H04M 3/436 |

* cited by examiner

*Primary Examiner* — Quan M Hua
(74) *Attorney, Agent, or Firm* — Nath, Goldberg & Meyer; Joshua B. Goldberg

(57) ABSTRACT

The invention relates to a method (100) of detecting a "soliciting" telephone number that is being used fraudulently for soliciting calls to "target" numbers.

Figure 1:
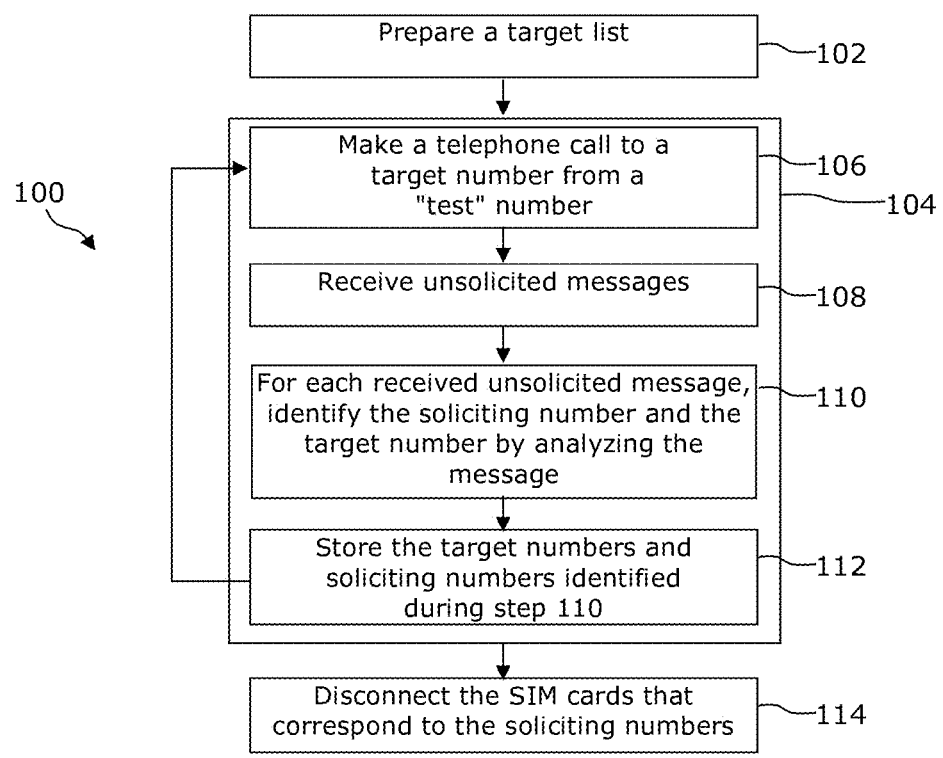

The method (100) comprises a plurality of iterations of a detection stage (104) comprising the following steps:
- sending (106) a telephone call to at least one target number;
- receiving (108) at least one message;
- detecting (110) at least one soliciting number from said received message; and
- detecting a new target number in said received message; the method being characterized in that it includes a new iteration of the detection stage (104) using said new target number when said target number is a new number.

The invention also provides a system for performing such a method (100).

12 Claims, 2 Drawing Sheets

METHOD AND A SYSTEM FOR DETECTING TELEPHONE NUMBERS USED BY SIM BOXES FOR SOLICITING TELEPHONE CALLS

FIELD OF THE INVENTION

The present invention relates to a method of detecting telephone numbers, referred to as "soliciting" telephone numbers, that are used, e.g. by SIM boxes, for soliciting telephone calls to telephone numbers referred to as "target" numbers, and in particular calls that are either charged at a premium rate or else subjected to specific pricing. The invention also relates to a system for performing such a method.

The field of the invention is that of detecting SIM boxes or SIM cards associated with telephone numbers that are used for soliciting telephone calls to other numbers.

STATE OF THE ART

Mobile telephone networks are subjected to techniques for bypassing interconnection. Such bypassing takes place when calls involve a plurality of mobile telephone networks. SIM cards are used in fraudulent manner within a first telephone network to terminate a call coming from a second telephone network. Solutions have been developed for detecting the SIM cards used for such bypassing, in particular by comparing caller identifiers.

There also exists another fraudulent use of SIM cards within a single telephone network. These frauds consist in sending an unsolicited message (e.g. of SMS or MMS type) from a telephone number referred to below in this application as a "soliciting" number, and requesting a call to a telephone number, referred to below in this application as a "target" number, on the pretext of listening to a voice message or of receiving an exceptional win. The target number used is generally the subject of specific pricing such that each telephone call to the target number provides the fraudsters with financial gain.

At present, when an unsolicited message is sent by a soliciting number, the SIM card that is associated therewith is disconnected. Unfortunately, that solution serves to detect fraudulently-used SIM cards one by one. Consequently, massive detection and disconnection of fraudulent SIM cards is limited. Generally, using that technique, identifying a group of SIM cards that are being used in fraudulent manner devours a large amount of time.

An object of the invention is to mitigate the above drawback.

Another object of the invention is to propose a method and a system that is faster, more effective, and that provides better performance for detecting soliciting numbers, and thus the SIM cards that are associated therewith, i.e. numbers setting out to solicit telephone calls to target numbers that are the subject of specific pricing.

SUMMARY OF THE INVENTION

The invention enables at least one of the above objects to be achieved by means of a method of detecting at least one telephone number, referred to as a "soliciting" number, that is being used for soliciting telephone calls to at least one telephone number, referred to as a "target" number, said method comprising a "detection" stage comprising the following steps:

sending a telephone call by means of at least one robot using at least one "test" telephone number, the telephone call being sent to at least one previously-detected target number;

receiving at least one message at said test number; and
for at least one received message:
detecting a telephone number contained in said telephone message and storing said number as a target number when said number is a new number; and/or
storing the telephone number that sent said message as a soliciting number when said number is a new number;
said method including at least one new iteration of said detection stage using at least one new target number detected during said detection step.

Thus, the method of the invention presents a proactive approach for detecting soliciting numbers that are being used fraudulently, e.g. by SIM boxes, for soliciting fraudulent calls to target numbers. More precisely, the method of the invention makes provision for making calls to target numbers in order to detect new soliciting numbers on the basis of messages received as a result of these calls, and of making new calls to the new target numbers, and so on.

Consequently, the method of the invention serves to stimulate calls from SIM cards being used fraudulently, e.g. by SIM boxes, thereby enabling them to be detected more quickly, more effectively, and with better performance. Furthermore, unlike present techniques that detect a soliciting number in individual manner, the method of the invention makes it possible to detect a set of soliciting numbers, such as a SIM card server, also known as a SIM box, being operated by a fraudster.

Advantageously, the method of the invention may also further comprise a preliminary step of preparing a "target" list comprising at least one target number.

This preliminary step may be performed before the first iteration of the detection stage.

In implementations, the preliminary step of preparing a target list may comprise reading at least one telephone number in a list of premium rate numbers.

Such a list may be a public list of premium rate numbers for value added services.

Such a list may be a list of premium rate numbers that have already been the subject of complaints or reports from users who have been victims of excess billing.

Such a list may also be prepared by running a campaign of test calls sent to potential target numbers and by analyzing billing data for those test calls. The potential target numbers may be selected randomly, or they may be selected from numbers that have previously been reported as being potentially fraudulent.

Advantageously, for at least one target number, the step of sending at least one telephone call may comprise sending a voice call to said target number.

Under such circumstances, the call robot sends a call to the target number.

The call robot may be configured to wait until the call is answered. If it is answered, it is then possible, optionally, to send a sound signal so that the test call resembles as much as possible a call sent from a real user. The sound signal may be a previously stored sound signal, or it may be selected from a plurality of previously stored sound signals.

Alternatively, the robot may be configured to hang up after a predetermined number of rings, without waiting for the call to be answered.

Alternatively, or in addition, for at least one target number, the step of sending at least one telephone call may comprise sending a message of SMS, SMS+, or MMS type.

Under such circumstances, the message that is sent may be an empty message.

Alternatively, the message that is sent may be a message of content that is not empty but that has previously been generated and stored. By way of example, such a message may be selected from a plurality of previously stored messages.

In an implementation, the step of detecting a target number in the message may comprise analyzing the content of the message.

When the message is a written message, of SMS or MMS type, such analysis may comprise analyzing the syntax of the message in order to identify a numerical or possibly an alphanumerical string corresponding to a telephone number.

When the message is a sound message, such analysis may comprise frequency analysis of the signal constituting said message in order to detect a numerical or possibly an alphanumerical string corresponding to a telephone number.

In particular, when the received message is sent by a soliciting number that is a short number, the target number is generally included in the body of the message. Under such circumstances, the body of the message may be analyzed in order to detect the target number.

Furthermore, when the number sending the received message is a standard telephone number, as contrasted to a short number, the standard telephone number may correspond to a SIM card used in a SIM box, or to a SIM card used for soliciting a call to a target number that is the subject of specific pricing.

When a new telephone number is detected during the detection step, that number is compared with a list of previously listed target numbers. If it is already present in the list, then it is not considered as being a new target number. Otherwise, it is stored as a new target number.

In a particular implementation that is not limiting in any way, the method of the invention may include at least one iteration of the detection stage making use solely of one or more new target numbers detected during an earlier iteration of said detection stage.

Under such circumstances, in this iteration of the detection stage, no use is made of the target number(s) that have already been tested during preceding iterations.

In a non-limiting example of this implementation, each new iteration of the detection stage makes use solely of one or more new target numbers detected during an earlier iteration. In this implementation, each target number is tested once only.

This implementation presents the advantages of limiting call costs and of limiting the number of telephone calls.

In another implementation, the method of the invention may include at least one iteration of the detection stage using at least one target number that has previously been used in an earlier iteration.

Under such circumstances, in this iteration of the detection stage, one or more target numbers that have already been tested in the past may be tested again, together with new target numbers.

This implementation presents the advantage of testing a target number several times over and thus of performing detection that is more complete that can lead to detecting other soliciting numbers and other target numbers that are associated therewith, if any.

The term "earlier" iteration is used to mean an iteration that was performed beforehand, and that may optionally be the most recently performed iteration.

The method of the invention may also include a step of deactivating at least one SIM card associated with a soliciting number.

For this purpose, the or each detected soliciting number may be communicated to the operator when, according to the international numbering plan, the number belongs to that operator, or to the operator to which the SIM card belongs. The operator can then deactivate the SIM card, thereby putting an end to the use of the telephone number associated with said SIM card.

In another aspect of the same invention, there is provided a system for detecting a telephone number, referred to as a "soliciting" number, that is being used for soliciting a telephone call to at least one telephone number, referred to as a "target" number, said system comprising:
- at least one "call" robot for making test calls to one or more soliciting numbers using one or more test numbers; and
- at least one server configured to perform or trigger all of the steps of the method according to any preceding claim.

The call robot and the server may be located on the same site.

Alternatively, the server may be remote from at least one call robot. Under such circumstances, the server may communicate with said remote call robot via an Internet type communications network.

DESCRIPTION OF THE FIGURES AND OF IMPLEMENTATIONS AND EMBODIMENTS

Figure 2:
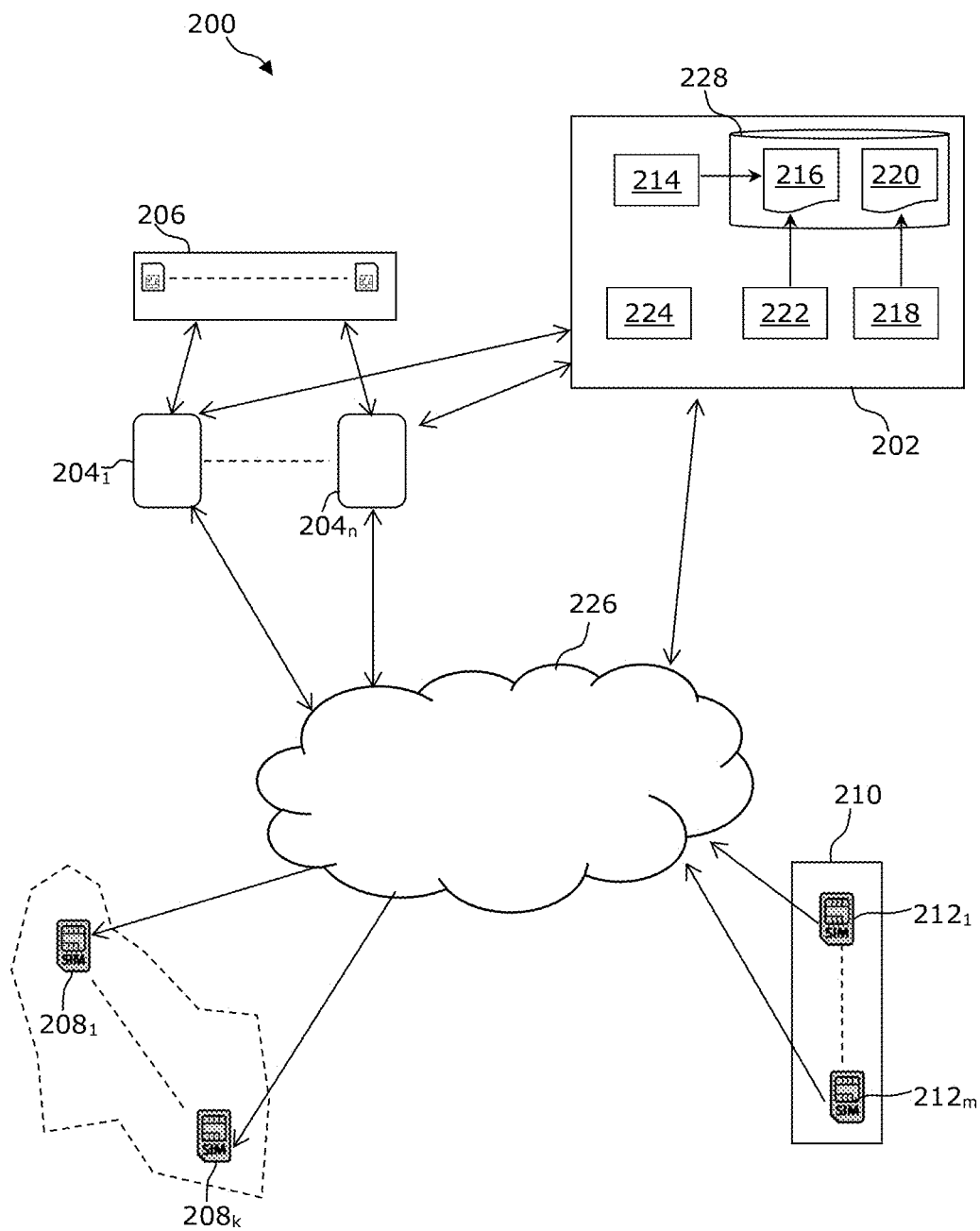

Other advantages and characteristics appear on reading the following detailed description of non-limiting examples, and the accompanying drawings, in which:

FIG. 1 is a diagram of a non-limiting implementation of the method of the invention; and FIG. 2 is a diagram of an example of the system of the invention.

Naturally, the implementations and embodiments that are described below are not limiting in any way. In particular, variants of the invention may be devised comprising only a selection of the characteristics described below in isolation from other described characteristics, providing the characteristics that are selected suffice to impart a technical advantage or to distinguish the invention from the state of the prior art. This selection comprises at least one preferably functional characteristic without structural details, or with only a portion of its structural details if that portion alone suffices to confer a technical advantage or to distinguish the invention relative to the state of the prior art.

In particular, all of the variants, implementations, and embodiments described can be combined with one another if there is no technical reason for preventing such combination.

In the figures, elements that are common to more than one of the figures are given the same references.

FIG. 1 is a diagram showing a non-limiting implementation of the method of the invention for detecting bypassing in a given telephone network.

The method 100, shown in FIG. 1, comprises a preliminary step 102 during which a "target" list is prepared comprising at least one target telephone number. Each target number added to the target list is a telephone number that is subjected to specific pricing enabling fraudsters to obtain a financial gain.

By way of example, and in non-limiting manner, a target number may be a premium rate telephone number, or a telephone number in another mobile telephone network. A target number may be identified in a list of premium rate telephone numbers.

A target number may be a telephone number that has previously been reported by a user who has been the victim of unexpected and high billing.

A target number may be identified by one or more robots carrying out a calling campaign to random numbers, and by analyzing the cost of each call.

Once the list has been prepared, the method 100 comprises at least two iterations of a stage 104 of detecting soliciting numbers that are being used fraudulently, e.g. in SIM boxes, to solicit telephone calls to target numbers, by the means of unsolicited messages that they send to users.

The detection stage 104 comprises a step 106 during which a robot sends a telephone call to a target number. A telephone number, referred to as a "test" number, is used for sending this test call. The test call may be a message, of SMS or MMS type, that is sent to the target number. Alternatively, the test call may be a voice call that may be answered or unanswered, with or without any sound signal being sent.

The step 106 may be performed for each target number, using the same test number or with different test numbers.

Sending a test call causes unsolicited messages to be received during a step 108 inviting a telephone call to be made in the form of a voice call or a message to a target number specified in said message.

During the step 110, each received message is analyzed in order:
- to identify a soliciting telephone number: this number is the number used for sending the message; and
- to identify a target number: this number is included in the body of the message. This is the number for which a request is being made explicitly to send a voice call or to send a message. This number is generally the subject of special pricing, such as a premium rate service or a foreign telephone number, for example.

When the received message is a written message, identifying the target number comprises analyzing the text of the message in order to identify a numerical or an alphanumerical string corresponding to a telephone number.

When the received message is a sound message, identifying the target number comprises frequency analysis of the message in order to identify a numerical or an alphanumerical string corresponding to a telephone number.

During a step 112, the target number detected in the unsolicited message received in step 108 and identified during step 110 is stored as a target number for a new iteration of the detection stage 104, in particular when the target number is a new number.

This step 112 can store each new target number detected during the step 110 in the target list prepared during the preliminary step 102. Alternatively, this step 112 may store each new target number detected during the step 110 in a new list, which is used as a target list during a future iteration of the detection stage 104.

The step 112 also stores the soliciting number in a list, referred to as a "soliciting" list, in particular when the soliciting number is detected as being a new number.

The detection stage 104 is repeated at least one more time, either with the initial target list updated with the new target numbers identified during the step 110, or else with a new target list prepared during the step 112.

The detection stage 104 may be repeated as many times as necessary and/or desired, e.g. until no new target number is detected.

After the detection stage 104, the method 100 comprises a step 114 of disconnecting SIM cards associated with each soliciting number detected during the step 110 and stored during the step 112.

FIG. 2 is a diagram showing a non-limiting embodiment of a system of the invention.

The system 200 as shown in FIG. 2 includes a server 202. The server 202 is in communication with robots $204_1$-$204_n$ that are located on a single site or on different sites that are remote from one another. The server 202 may be in communication with each of the robots 204 via an Internet type communications network, e.g. via a virtual private network (VPN).

The robots 204 are in communication with a SIM card server 206 that may be located on a site that is remote from the robots 204, or on the same site(s) as the robots 204. The SIM card server 206 may be in communication with each of the robots 204 via an Internet type communication network, e.g. via a VPN.

The robots 204 are arranged to send test calls, such as test calls or test messages to one or more target numbers $208_1$-$208_k$ that are subject to specific pricing.

In return, unsolicited messages are sent to the call robots $204_1$-$204_n$ by a SIM card server 210, also referred to as a SIM box, making fraudulent use of soliciting numbers associated with SIM cards $212_1$-$212_m$.

The server 202 includes software and/or hardware modules configured to perform the stage of preparing a list of target numbers.

In particular, the server 202 has a module 214 configured to consult directories of premium rate numbers, a directory of numbers that have been reported as fraudulent by users, etc., in order to prepare a "target" list 216 of target numbers.

The server 202 includes an analysis module 218 for analyzing each message received by the call robots $204_1$-$204_n$ in order to detect and store a soliciting number corresponding to the telephone number that sent the message. The soliciting number is stored as a soliciting number in a list 220 if it is a new number that is not already included in the list 220. The soliciting number corresponds to a telephone number, e.g. associated with a SIM card 212 used in the SIM box 210.

The server 202 includes an analysis module 222 for analyzing the content of each message received by the call robots $204_1$-$204_n$ in order to detect a target number within the body of such a message and then store it, the target number corresponding to the telephone number for which the message is soliciting a telephone call. The target number is stored as being a target number in the target list 216, providing it is a new number that is not already included in the list 216. The target number corresponds to a telephone number, e.g. associated with a SIM card $208_i$, that is the subject of specific pricing.

The server 202 also includes a module 224 for monitoring and controlling the call robots 204 in order to make test calls via a mobile telephone network 226.

The server 202 also has storage means 228 for storing various kinds of data, such as the lists 216 and 220.

Naturally, the invention is not limited to the above-described examples.

What is claimed is:

1. A method (100) of detecting at least one telephone number referred to as a "soliciting" number, that is being used for soliciting telephone calls to at least one telephone number, referred to as a "target" number, said method (100) comprising a "detection" stage (104) comprising the following steps:

sending (106) a telephone call by means of at least one robot (204) using at least one "test" telephone number, the telephone call being sent to at least one previously-detected target number;

receiving (108) at least one message at said test number; and for at least one received message:

detecting (110) a telephone number contained in said telephone message and storing (112) said number as a target number when said number is a new number; and/or storing (112) the telephone number that sent said message as a soliciting number when said number is a new number;

said method (100) including at least one new iteration of said detection stage (104) using at least one new target number detected during said detection step.

2. A method (100) according to claim 1, characterized in that it further comprises a preliminary step (102) of preparing a "target" list (216) comprising at least one target number.

3. A method (100) according to claim 2, characterized in that the preliminary step (102) of preparing a target list (216) comprises reading at least one telephone number in a list of premium rate numbers.

4. A method (100) according to claim 1, characterized in that, for at least one target number, the step (106) of sending at least one telephone call comprises sending a voice call.

5. A method (100) according to claim 1, characterized in that, for at least one target number, the step (106) of sending at least one telephone call comprises sending a message of SMS, SMS+, or MMS type.

6. A method (100) according to claim 1, characterized in that, when the received message is a written message, the detection step (110) comprises analyzing to syntax of said message in order to identify a numerical or possibly an alphanumerical string corresponding to a telephone number.

7. A method (100) according to claim 1, characterized in that when the received message is a sound message, the detection step (110) comprises frequency analysis of the signal constituting said message in order to identify a numerical or possibly an alphanumerical string corresponding to a telephone number.

8. A method (100) according to claim 1, characterized in that it includes an iteration of the detection stage (104) making use solely of one or more new target numbers detected during an earlier iteration of said detection stage (104).

9. A method (100) according to claim 1, characterized in that it includes an iteration of the detection stage (104) using at least one target number that has previously been used in a preceding iteration.

10. A method (100) according to claim 1, characterized in that it includes a step (114) of deactivating at least one SIM card ($\mathbf{212_1}$-$\mathbf{212_m}$) associated with a soliciting number.

11. A system (200) for detecting a telephone number, referred to as a "soliciting" number, that is being used for soliciting a telephone call to at least one telephone number, referred to as a "target" number, said system (200) comprising:

at least one "call" robot ($\mathbf{204_1}$-$\mathbf{204_n}$) for making test calls to one or more soliciting numbers using one or more test numbers; and at least one server (202) configured to perform or trigger all of the steps of the method (100) according to claim 1.

12. A system (200) according to claim 11, characterized in that the server (202) is situated remotely from one or more call robots ($\mathbf{204_1}$-$\mathbf{204_n}$).

\* \* \* \* \*